Figure 1:
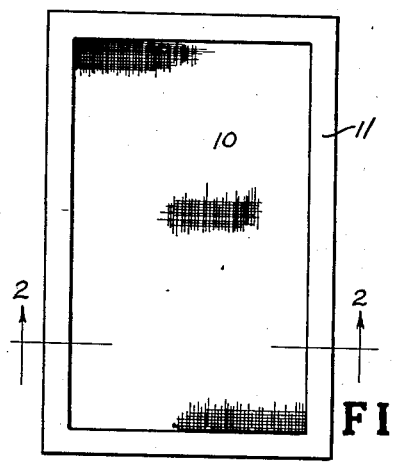

July 25, 1933.                G. S. ROWELL                 1,919,482
                            PHOTOGRAPHIC SCREEN
                             Filed Oct. 3, 1931

Inventor
George S. Rowell,
By Bates Goldrick & Mears,
Attorneys

Patented July 25, 1933

1,919,482

UNITED STATES PATENT OFFICE

GEORGE S. ROWELL, OF CLEVELAND, OHIO, ASSIGNOR TO MULTIGRAPH COMPANY, OF WILMINGTON, DELAWARE, A CORPORATION OF DELAWARE

PHOTOGRAPHIC SCREEN

Application filed October 3, 1931. Serial No. 566,641.

This invention relates to photographic screens, and more particularly to screens such as are used in connection with photolithographic printing processes.

It is well known that in order to reproduce the fine gradations in tone by a printing process, such as photolithography, it is customary to break up the printing areas into minute dots or squares, such breaking up being accomplished by means of a screen which produces a pattern of light and dark lines and dots in the light falling on the sensitive surface of the printing plate. At the present time such screens comprise closely ruled cross lines or other patterns imposed on a sheet of glass, usually by means of a photographic process. The surface of the glass bearing the pattern is then covered by another sheet of glass, the two being cemented together to protect the lines or patterns. These screens give satisfactory results and produce sharp screen images when carefully used by skilled operators. However, such screens are expensive to manufacture, are fragile and because of the differences in the thickness of the glass, the screens often must be focused individually in the camera by visual focusing, an operation which requires a high degree of skill and also complicated camera mechanism.

It has also been proposed to form photographic screens from woven wire fabric. Screens of this type have the advantages of being less expensive and of being relatively light and easy to handle, but they embody a serious disadvantage in that the thickness of the wire fabric prevents the proper focusing of the screen to obtain a sharp screen image. Furthermore, it is extremely difficult to obtain wires sufficiently small to provide a very fine screen, such as are employed in the highest grade type of photographic reproductions.

The principal objects of my invention are to provide a light, thin screen, which may be easily manufactured and which cannot be broken, by means of which a sharp image of the screen can be obtained, and which can be accurately focused. Another object is to provide screens of uniform thickness so that any screen can be accurately positioned in the camera by a previously adjusted holder, thus eliminating the usual visual focusing. A further object is to provide a screen which will produce a pattern effect in the background of the reproduction.

Briefly, my screen comprises a supporting frame, which is adapted to support a nonmetallic open mesh fabric, made of opaque threads or strands, any one of several types of fabric being employed to obtain the desired screen effect.

Figure 2:
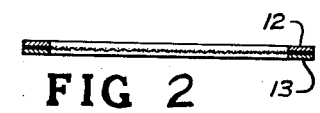
Figure 4:
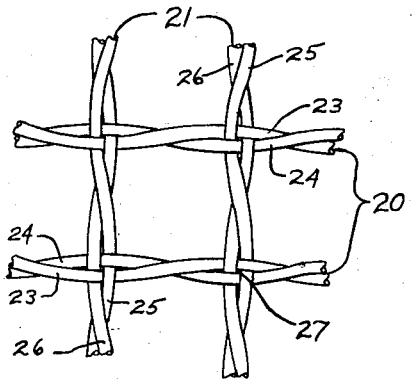
Figure 5:
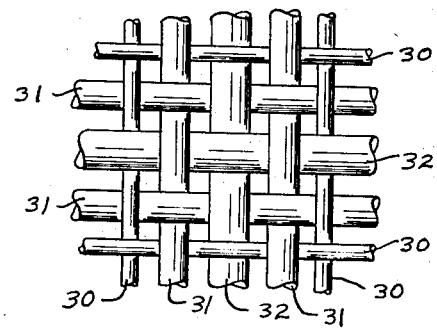

Referring to the drawing, Fig. 1 is a plan view of a screen made according to my invention; Fig. 2 is a section along the line 2—2 of Fig. 1; and Figs. 3, 4 and 5 are greatly enlarged plan views of portions of various forms of screen fabrics which are employed in making the various types of screens.

As shown in Fig. 1, the screen material indicated generally at 10 may be supported by a metal frame 11. The frame 11 may comprise two similar hollow rectangular members, 12 and 13. In producing the screen, the fabric may be stretched across the opening in the member 13, for example, and cemented thereto. Another layer of cement is applied to the fabric and the member 12 laid down on the fabric and thereafter the members 12 and 13 are secured together, as by soldering the edges 14.

The fabric is preferably woven of opaque textile threads, or of filaments of a cellulose material, which may be extruded in the desired size and shape. In any event, I prefer to use a fabric which is not fuzzy, that is, a hard fabric in which the fibres do not project radially from the threads or filaments, thus making it possible to obtain a sharp image and to avoid any loss of definition in the image of the screen on the plate.

Figure 3:
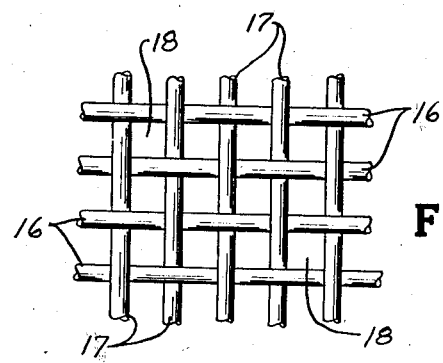

In the modification shown in Fig. 3 of the drawing, an ordinary open-mesh fabric is employed, woven of either ribbon-like flat filaments of artificial material, or cylindrical threads of the usual type. The strands 16 comprising the warp may be substantially identical with the strands 17 comprising the weft and the spacing is preferably the same, so that substantially square openings 18 will be formed, although for some purposes it may be desirable to have the strands intersect obliquely to provide openings of different shape.

Because of the high degree of flexibility of textile, or artificial fabrics such as extruded cellulose material, the fabric will be very thin, and thus it will be possible to accurately focus all parts of the screen, much more accurate focusing being obtainable than in the case of wire screen fabrics, in which the fabric has sufficient thickness caused by the stiffness of the wire to throw various parts of the wires surrounding the same minute opening out of focus. Furthermore, by employing textile material, it is possible to obtain a much finer screen than in the case of metal screens.

In the modification shown in Fig. 4 of the drawing, (note: this figure is enlarged to an even greater extent than Figs. 3 and 5) I have illustrated a screen which is formed of a very thin or flat fabric, thus, making it possible to produce an extremely sharp screen image on the photographic plate. In this modification the fabric is woven of warp threads 20 and weft threads 21, the threads being formed of two yarns or filaments 23 and 24, and 25 and 26, respectively, twisted together. At the intersections of the warp and weft threads, the yarns are split apart so that the threads actually pass through each other, as indicated clearly at 27. With a fabric of this sort, the thickness of the screen is substantially constant throughout, being the same at the intersections as at the intermediate portions of the threads. Furthermore, in this type of fabric there is little chance of the threads slipping along each other, and thus forming irregular openings or openings of different sizes.

In order to produce a background giving the effect of printing on a special fabric, I have provided a screen shown in the modification of Fig. 5 of the drawing. In this case, the fabric is woven of threads of varying sizes. Small threads 30, the threads 31 of intermediate size and the relatively large threads 32 may be employed in rotation in the warp and the weft. I prefer to make such screens of relatively coarse mesh, say fifty strands or threads to the inch, and when screens of this type are employed, the background will have the appearance of fabric, whereas in the reproduction itself enough of the screen effect will be lost to prevent any unpleasant or noticeable appearance. Obviously, other weaves of fabric may be employed to produce the desired effect in the background.

In the manufacture of screens embodying a fabric or textile mesh, the screen should be stretched tightly over the frame and if desired, the fabric material may be given a coat of some substance which will act to shrink the fabric and stretch it tighter. For example, banana oil or a cellulose solution, such as is employed in doping aeroplane wings may be used. Such a coating of "dope" will also result in eliminating any fuzzy appearance of the individual threads or filaments by cementing the extending fibres to the threads.

From the foregoing description of various forms of my invention, it will be seen that I have provided a light and inexpensive photographic screen, which may be accurately focused, and which will produce a sharp screen image. By reason of the fact that my screen is supported in a metal frame, which can be accurately constructed, the necessity for visual focusing is largely eliminated. By employing different types of fabrics, different screen effects can be obtained, and special effects in the background of the reproduction may be easily and economically produced. Furthermore, by making the screen according to the method disclosed herein, and by doping the fabric to shrink it, an extremely tight fabric can be obtained, and also the "dope" will have the effect of stiffening the fibres to a slight degree and preventing changes in the humidity of the air from affecting the fabric.

I claim:

1. A photographic screen comprising an open frame, a stretched open mesh fabric carried thereby and formed by intersecting sets of substantially parallel strands, the sets of strands comprising threads or filaments of varying size, whereby the screen will produce a pattern in the background of the reproduction.

2. A photographic screen comprising an open frame and stretched intersecting strands of opaque non-metallic material carried thereby, each of said strands comprising a twisted thread formed of a plurality of yarns, the yarns being spread apart at the various intersections in such a manner that the threads pass through each other, whereby an extremely flat or thin fabric is produced.

3. A photographic screen comprising an open frame and intersecting strands of non-metallic material carried thereby, each of said strands comprising a pair of twisted threads, the threads being spaced apart at the various intersections in such manner that each thread of the warp passes between two threads of the woof, and each thread of the woof passes between two threads of the warp.

4. The method of making screens suitable for photographic use, comprising taking an open mesh textile fabric of the desired fineness and placing it across an open boundary member, cementing the margin of said fabric to the boundary member, applying a similar boundary member over the fabric and securing the boundary members to each other, and thereafter coating the fabric with a substance adapted to shrink the fabric and to prevent it from being affected by moisture.

5. A photographic screen, comprising an open frame, and a taut open mesh fabric woven of threads or filaments of non-metallic material, secured at its margin to the frame, said frame comprising two boundary members between which the fabric extends and which are secured to the fabric and to each other.

6. A photographic screen, comprising an open frame, and a taut open mesh fabric woven of threads or filaments of non-metallic material, secured at its margin to the frame, said frame comprising two similar rectangular boundary members of metal between which the fabric extends and which are each cemented to the fabric and solder securing the metal members together at their outer edges.

GEORGE S. ROWELL.